United States Patent Office 2,853,493
Patented Sept. 23, 1958

2,853,493

PREPARATION OF THIOPHENECARBOXALDEHYDES

Arthur W. Weston, Waukegan Township, Lake County, Ill., assignor to Abbott Laboratories, North Chicago, Ill., a corporation of Illinois No Drawing. Application July 28, 1952
Serial No. 301,388

11 Claims. (Cl. 260—332.3)

The present invention relates to new compositions of matter and more particularly to a method of preparing certain heterocyclic compounds containing the thiophene ring.

The invention comprises the preparation of novel thiophenecarboxaldehyde and derivatives thereof. The general formula of the novel compound is:

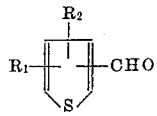

wherein $R_1$ and $R_2$ are hydrogen, alkyl groups containing from one to four carbon atoms inclusive, or halogen atoms.

The novel thiophenecarboxaldehydes are valuable intermediates in preparation of organic compounds, pharmaceutical compounds and the like some of which are disclosed in U. S. Patent No. 2,556,566.

The invention may be illustrated by the following examples:

EXAMPLE I

2-thiophenecarboxaldehyde

A mixture of 43.8 g. of dimethylformamide (technical grade) and 45.9 g. of phosphorus oxychloride is prepared by adding the phosphorus oxychloride dropwise to the dimethylformamide while stirring. The temperature of the mixture is maintained below 40° C. To the above mixture 25.2 g. of thiophene is slowly added and the mixture heated at a temperature of 100° C. for a period of 20 hours while stirring. The cooled reaction mixture is poured into ice water and the aqueous mixture extracted several times with ether. The ether extracts are concentrated on a steam bath and the residue fractionated. The product, 2-thiophenecarboxaldehyde, has a boiling point of 91–93° C. at 21 mm., and $n_D^{27.5}$ 1.5873.

EXAMPLE II

5-methyl-2-thiophenecarboxaldehyde

By treating a mixture of 0.6 mole of dimethylformamide and 0.3 of phosphorus oxychloride with 0.3 mole of 2-methylthiophene in the manner described in Example I the composition 5-methyl-2-thiophenecarboxaldehyde is prepared and it exhibits a boiling point of 112–113° C. at 21 mm.

EXAMPLE III

5-chloro-2-thiophenecarboxaldehyde

Following the procedure of Example I, one mole of diethylformamide and 0.5 mole of phosphorus oxychloride are reacted with 0.5 mole of 2-chlorothiophene to give 5-chloro-2-thiophenecarboxaldehyde. The product is further provided by extracting with ether and saturating the said extracts with sodium bisulfite solution. The addition salt is washed with ether, dissolved in water and the aldehyde is recovered by adding an excess of sodium carbonate solution. The dried ether extract has a boiling point of 91–92° C. at 13 mm.

In accordance with the foregoing specific examples the compounds of the present invention may be prepared by reacting thiophene with an N-lower alkylformamide where alkyl consists of one to four carbon atoms inclusive in the presence of phosphorus oxychloride or an equivalent condensing agent such such as phosphorus oxybromide or the like.

Following the disclosed procedure in using the desired substitute thiophene, the following compounds may be prepared 5-bromo-thiophene-2-carboxaldehyde, B. P. 114–115° C. at 14 mm., 3-methyl-2-thiophenecarboxaldehyde, B. P. 113–114° C. at 25 mm., 5-tertiary-butyl-2-thiophenecarboxaldehyde, B. P. 135–136° C. at 25 mm., other alkyl or halogen substitute thiophenecarboxaldehydes may be prepared by using the appropriate alkyl or halogen substituted thiophene.

Others may readily adapt the invention for use under various conditions of service, by employing one or more of the novel features disclosed or equivalents thereof. As at present advised with respect to the apparent scope of my invention, I desire to claim the following subject matter.

I claim:

1. The process of producing a compound of the formula

where R is a member of the group consisting of hydrogen, an alkyl group of from one to four carbon atoms inclusive, and halogen, which comprises reacting at a temperature of about 100° C. for about 20 hours a compound of the formula

where R is a member selected from the group consisting of hydrogen, an alkyl group of from one to four carbon atoms inclusive, and halogen, with a N,N di lower alkyl formamide in the presence of a condensing agent of the phosphorus oxychloride type with the said alkyl formamide serving as the only reaction solvent.

2. The process as in claim 1 for producing 2-thiophenecarboxaldehyde which comprises reacting thiophene with a N,N di lower alkyl formamide in the presence of the said condensing agent.

3. A process as in claim 1 for producing 5-methyl-2-thiophenecarboxaldehyde which comprises reacting 2-methylthiophene with a N,N di lower alkyl formamide in the presence of the said condensing agent.

4. A process as in claim 1 for producing 5-chloro-2-thiophenecarboxaldehyde which comprises reacting 2-chlorothiophene with a N,N di lower alkyl formamide in the presence of the said condensing agent.

5. A process as in claim 1 for producing 5-bromo-thiophene-2-carboxaldehyde which comprises reacting 2-bromothiophene with a N,N di lower alkyl formamide in the presence of the said condensing agent.

6. A process as in claim 1 for producing 5-tertiary butyl-2-thiophenecarboxaldehyde which comprises reacting 2-tertiary butylthiophene with a N,N di lower alkyl formamide in the presence of the said condensing agent.

7. A process as in claim 1 for producing 2-thiophenecarboxaldehyde which comprises reacting thiophene with N,N dimethylformamide in the presence of phosphorus oxychloride.

8. A process as in claim 1 for producing 5-methyl-2- thiophenecarboxaldehyde which comprises reacting 2-methylthiophene with N,N dimethylformamide in the presence of phosphorus oxychloride.

9. The process as in claim 1 for producing 5-chloro-2-thiophenecarboxaldehyde which comprises reacting 2-chlorothiophene with N,N diethylformamide in the presence of phosphorus oxychloride.

10. The process as in claim 1 for producing 5-bromothiophene-2-carboxaldehyde which comprises reacting 2-bromothiophene with N,N dimethylformamide in the presence of phosphorus oxybromide.

11. The process as in claim 1 for producing 5-tertiary butyl-2-thiophenecarboxaldehyde which comprises reacting 2-tertiary butylthiophene with phosphorus oxychloride with N,N dimethylformamide in the presence of phosphorus oxychloride.

References Cited in the file of this patent

UNITED STATES PATENTS

| | | |
|---|---|---|
| 2,581,009 | Emerson et al. | Jan. 1, 1952 |
| 2,601,479 | Weston | June 24, 1952 |